United States Patent
DeFrance

Patent Number: 5,539,961
Date of Patent: Jul. 30, 1996

[54] SPRING-LOADED WEDGE DEAD END

[75] Inventor: Robert V. DeFrance, Poughkeepsie, N.Y.

[73] Assignee: Fargo Mfg. Company Inc., Poughkeepsie, N.Y.

[21] Appl. No.: 324,904

[22] Filed: Oct. 18, 1994

[51] Int. Cl.⁶ .................................................. F16G 11/00
[52] U.S. Cl. ..................... 24/136 R; 403/300; 403/314
[58] Field of Search ........................ 24/115 M, 136 R; 403/300, 309, 312, 313, 314

[56] References Cited

U.S. PATENT DOCUMENTS

| | | | |
|---|---|---|---|
| 482,975 | 9/1892 | Cope | 24/136 R |
| 1,238,167 | 8/1917 | McIntyre | 24/136 R |
| 1,814,933 | 7/1931 | Keen | 403/217 |
| 2,127,115 | 8/1938 | Hamilton | 24/136 R |
| 2,220,203 | 11/1940 | Branin | 24/136 R |
| 3,205,300 | 9/1965 | Becker | 403/314 X |
| 3,274,654 | 9/1966 | Becker | 403/287 |
| 3,673,312 | 6/1972 | Vockvoth | 24/136 R X |
| 3,758,922 | 9/1973 | Field | 24/136 R |
| 4,183,686 | 1/1980 | De France | 403/11 |
| 4,407,471 | 10/1983 | Wilmsmann et al. | 24/136 R X |
| 4,572,565 | 2/1986 | Epstein | 24/136 R X |
| 4,872,626 | 10/1989 | Liénart | 248/63 |
| 5,015,023 | 5/1991 | Hall | 24/136 R X |

FOREIGN PATENT DOCUMENTS 13230  7/1916  United Kingdom ................ 24/115 M Primary Examiner—Blair Johnson
Assistant Examiner—Andrea Chop
Attorney, Agent, or Firm—Kane, Dalsimer, Sullivan, Kurucz, Levy, Eisele and Richard, LLP

[57] ABSTRACT

A spring-loaded wedge dead end for use in electrical transmission lines has upper and lower jaws which close upon one another in a wedging action to grasp the dead end of such a line. The wedge dead end includes a U-shaped clevis for use in attaching it to a pole or the like, and upper and lower jaw guides which form a U-shaped channel in which the upper and lower jaws are disposed. The jaws are spring-biased toward a closed position, are coupled so as to move in a corresponding manner, and may be locked in a fully open position, from which an installer may release it when an electrical transmission line is correctly placed between the open jaws to simplify the dead-ending of the line.

6 Claims, 4 Drawing Sheets

SPRING-LOADED WEDGE DEAD END

BACKGROUND OF THE INVENTION

1. Field of the Invention

The present invention is a dead end connector for gripping and securing wires, such as electrical conductors on power lines, and for maintaining them in tension.

2. Description of the Prior Art

In the field of electrical power generation and transmission, electrical transmission lines must be periodically anchored to a supporting structure, such as a tower, and strung between supporting structures in a series leading from an electric power generator to a point of use. Couplings, commonly known as "dead ends", are frequently used to attach the electrical transmission line to the supporting structure, or, more precisely, to an insulated mount attached to the supporting structure.

In general, dead ends, such as those discussed and disclosed in U.S. Pat. No. 3,274,654, are used for this purpose. That patent shows a hinged dead end connector, which holds an electrical transmission line between an elongated body and a pressure pad, which closes onto the elongated body.

U.S. Pat. No. 4,183,686 shows another dead end connector for an electrical transmission line. The connector includes an elongated body and a cable-receiving longitudinal channel formed in the body. A pressure pad is provided with an elongated base portion which is adapted to be aligned with the longitudinal channel of the body. A cross piece is on the side of the base portion opposite to the side adjacent the channel of the body when aligned therewith, and the cross piece extends across and outwardly from both sides of the aligned body and pad at an oblique angle with respect thereto. Coupling structure is provided for retaining the pressure pad in overlying aligned position with respect to the channel to hold a portion of the electrical transmission line therein with the cross piece enabling the provision of a holding pressure along at least a substantial portion of the engagement surface of the pressure pad with the electrical transmission line.

These and other prior-art dead end connectors hold the dead end of an electrical transmission line through a clamping action generated when two members of the connectors are bolted to one another. They suffer from the disadvantage that the magnitude of the clamping action depends on the degree to which the two members are compressed together, which in turn depends upon the amount the installer tightens the bolts holding them together. Naturally, variations will be observed from installer to installer. Clearly, a dead end connector, having a clamping action independent of installer variation, and more readily and quickly installed than those requiring bolts to generate the clamping action, would be a boon to the field of electrical power generation and transmission.

SUMMARY OF THE INVENTION

With the preceding background in mind, it is the purpose of the present invention to provide a dead end for electrical transmission lines wherein the connection is accomplished with a simple and effective structure that can be quickly and easily coupled to the cable.

Accordingly, the present invention is a spring-loaded wedge dead end which comprises a body portion having a first end and a second end separated by a single leg. At the first end are fastening means for fastening the dead end to a pole or the like. At the second end, upper and lower jaw guides are supported in spaced angular relationship to one another.

The upper and lower jaw guides provide a U-shaped channel and converge toward each other, so that the U-shaped channel is gradually narrowed or decreased in transverse dimension as it extends in a direction from the first end toward the second end.

Upper and lower jaws are slidably supported in the U-shaped channel so as to come into a wedging engagement about their movement toward the second end. The upper and lower jaws are further spring-biased toward the second end and into a closed position. The upper and lower jaws may further be locked into an open position, and released when an electrical transmission line is disposed therebetween, to simplify the dead-ending of the line.

The present spring-loaded wedge dead end will now be described in more complete detail with frequent reference being made to the several drawing figures, which may be identified as follows.

DETAILED DESCRIPTION OF THE PREFERRED EMBODIMENT

Figure 1:
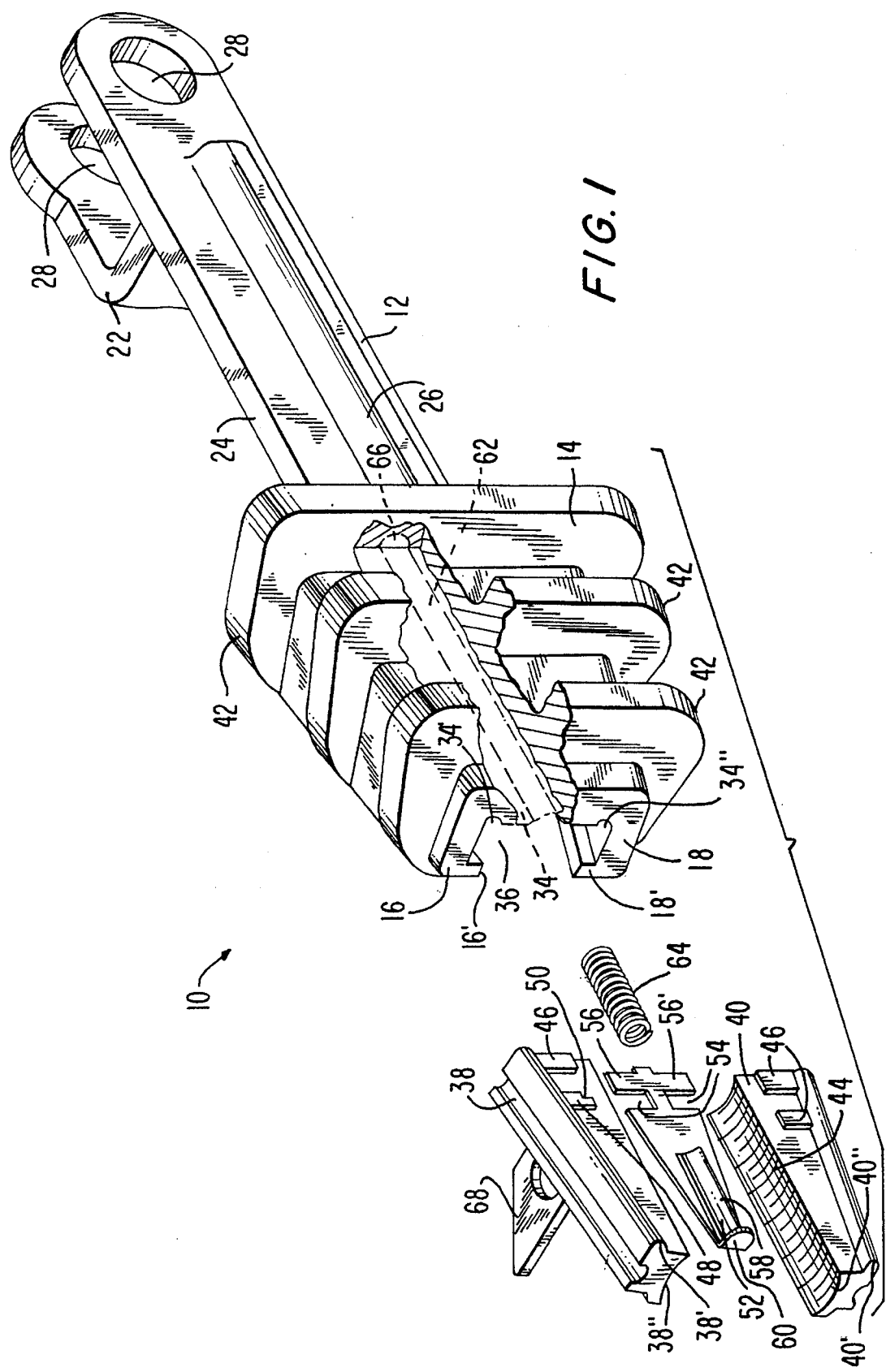
FIG. 1 is an exploded, and partially sectional, perspective view of the spring-loaded wedge dead end connector of the present invention.
Figure 2:
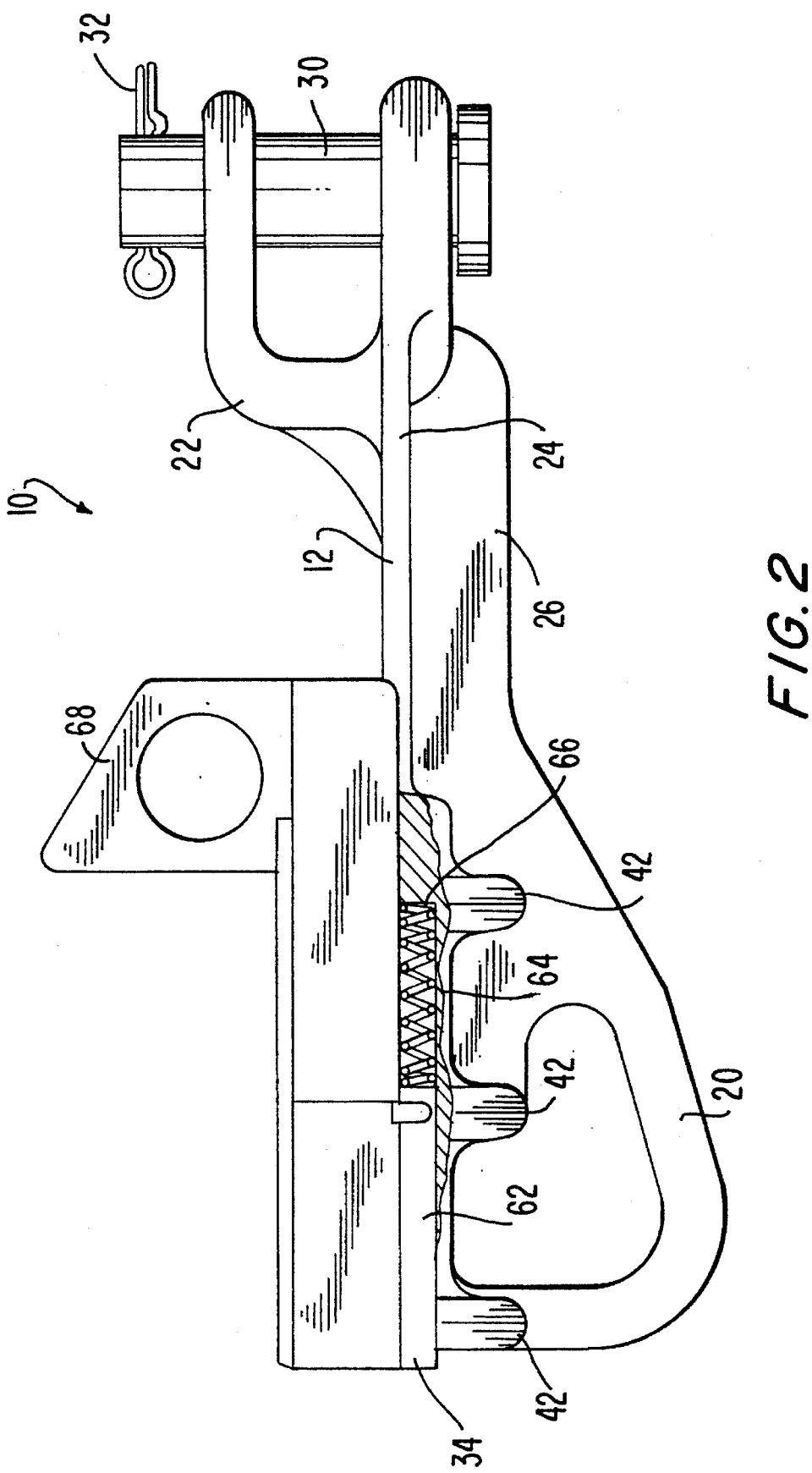
FIG. 2 is a top, and partially, sectional, view of the connector.

The present spring-loaded wedge dead end 10 has a body portion 12 of unitary construction cast of a durable metal material, such as aluminum. The body portion 12 includes a wedge section 14 which, in turn, includes upper and lower jaw guide walls 16 and 18, respectively, and gripping ring 20, the latter of which has been cut away in FIG. 1. The body portion 12 further comprises a U-shaped clevis 22 and a single leg 24 which integrally connects the clevis 22 to the wedge section 14. As seen in FIGS. 1 and 2, the gripping ring 20 is extended to provide a strengthening rib 26 for the leg 24.

The U-shaped clevis 22 is provided with apertures 28, through which a clevis pin or bolt 30 may be passed. The U-shaped clevis 22 is adapted to receive a pivoted bracket (not shown) or other fastening element, of a size to fit between the arms of the U-shaped clevis 22 and to be attached to the main body portion 12 by means of the clevis pin or bolt 30. Cotter pin 32 fits through an aperture (not shown) on bolt 30 in order to secure the bolt 30 in place.

As may be seen in FIG. 1, the upper and lower jaw guide walls 16,18 are supported in spaced relationship by wall 34, which is an extension of leg 24, to provide a U-shaped channel 36 which widens uniformly and gradually toward the U-shaped clevis 22.

The U-shaped channel 36 captures the upper and lower jaws, 38 and 40 respectively, slidably therein in a wedge fit. In order to achieve this, wall 34, which functions as the base of the U-shaped channel 36, is gradually widened or increased in transverse dimension as it extends from the end of the body portion 12 of the dead end 10 toward the center, or from left to right in FIG. 1. Transverse ribs 42 are provided for strengthening.

Wall 34 is provided with guide channels 34',34", which diverge from one another as wall 34 is widened. Walls 16' and 18' project from upper jaw guide wall 16 and lower jaw guide wall 18, respectively, opposite the channels 34',34", respectively. Projecting walls 16' and 18' are generally parallel to wall 34 and maintain upper jaw 38 and lower jaw 40 within their respective jaw guides as the upper jaw 38 and lower jaw 40 are moved from right to left and back. The upper jaw 38 and lower jaw 40 are formed with projecting ribs 38' and 40', respectively, for which the guide channels 34',34" provide tracks during such movement. Movement of the upper jaw 38 and lower jaw 40 to the left in FIG. 1 brings them continually closer together until they abut one another, thereby providing a stop means arresting further movement to the left. In fact, as will be discussed below, movement of the upper and lower jaws 38,40 is biased toward such a closed position.

Figure 5:
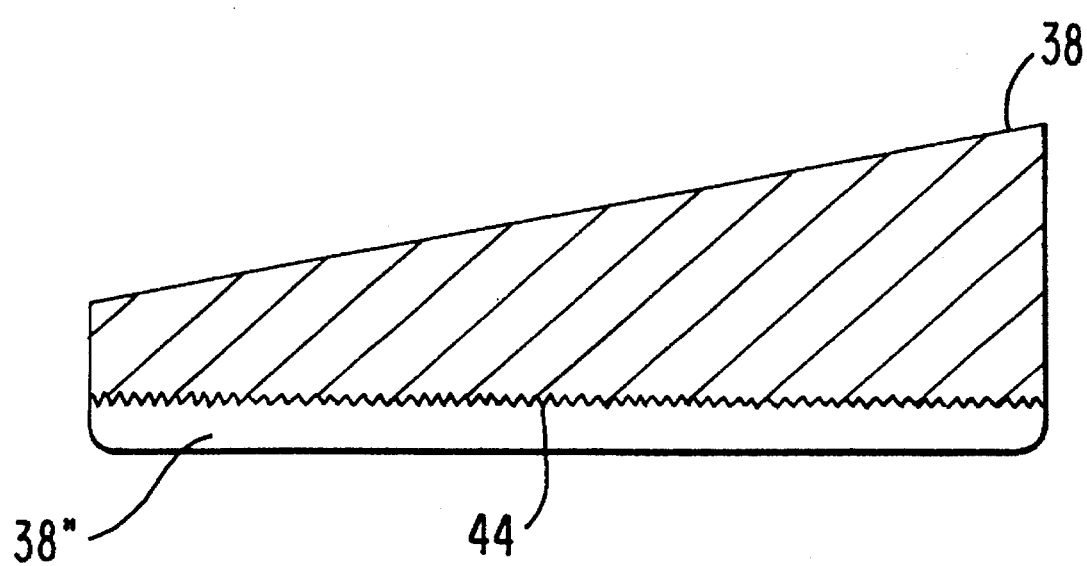
FIG. 5 is a cross-section taken through the upper jaw of the connector.

The upper jaw 38 and lower jaw 40 have arcuate faces 38" and 40", respectively, formed with projecting transverse teeth 44, for receipt of an electrical transmission line. These may be seen more clearly in the cross section of upper jaw 38 included herein as FIG. 5. Transverse teeth 44 bite into an electrical transmission line to increase the grip of the present dead end connector thereon.

Figure 3:
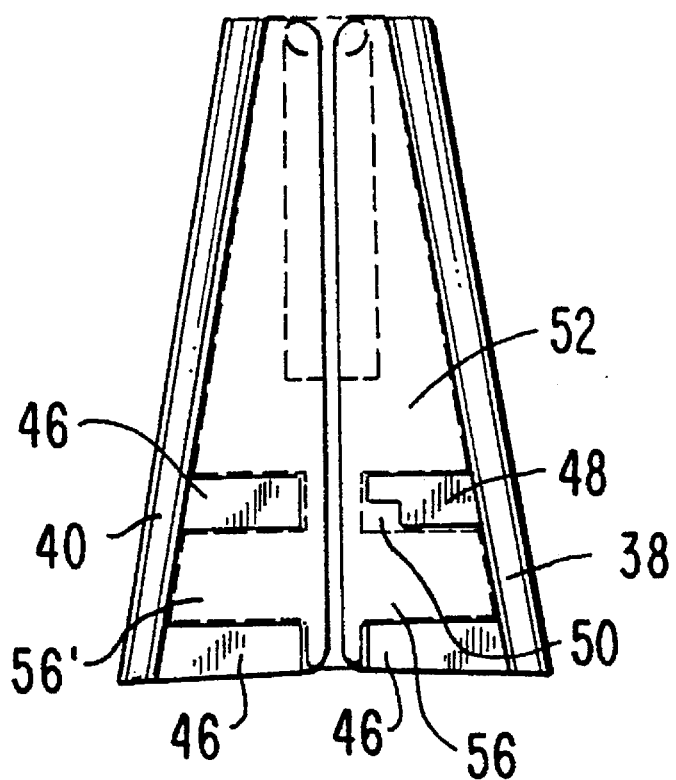
FIG. 3 is a view of the backside of the upper and lower jaws, showing their relationship to the floater.

In order to ensure that the movement and positioning of the upper jaw 38 and the lower jaw 40 are at all times coordinated, guide means are provided. As shown in FIGS. 1 and 3, the backsides (facing the viewer of the figures) of the upper jaw 38 and lower jaw 40 have raised guides 46. The upper jaw 38 has a raised guide 48 with a notch 50, the purpose of which will be described below. A floater 52 having cut-outs 54 defining tabs 56,56' which fit between raised guides 46,48 resides beneath the upper and lower jaws 38,40, separating them from wall 34. The cooperation of tabs 56,56' on floater 52 and raised guides 46,48 on the backsides of the upper and lower jaws 38,40 ensures that the longitudinal motion of the jaws will be coordinated.

In other words, when either the upper jaw 38 or lower jaw 40 is moved along the length of guide channels 34',34" the contact of raised guides 46 48 on the one of the upper and lower jaws 38,40 being moved against one of the tabs 56,56' on floater 52 will move the floater 52, which, in turn, will move the other of the upper and lower jaws 38,40 by the engagement of the other of the tabs 56,56' against the raised guides 46,48 on the backside thereof. Further, because of the configuration of wall 34 and the angular relationship between the faces of the upper jaw guide 16,16',34' and lower jaw guide 18,18',34", movement of jaws 38,40 lengthwise will result in transverse, toward or away, movement in wedging action. The interengagement of tabs 56,56' with raised guides 46,48 ensures that the upper jaw 38 and the lower jaw 40 will move in concert with one another. The length of the tabs 56,56' is determined by the extent the jaws 38,40 can move longitudinally, so that they will not disconnect from the floater 52. Longer tabs 56,56' are required for a longer wedge section 14.

Turning back, now, to FIGS. 1 and 2, floater 52 also has a concave section 58 facing downwardly toward wall 34, and a downward oriented tab 60. To accommodate the latter, wall 34 is provided with a channel 62. Finally, a spring 64 is disposed in channel 62, where it is compressed between tab 60 of floater 52 and the end wall 66 of channel 62. Concave section 58 of floater 52 lies over the channel 62 and spring 64, and lends stability to the structure. It may now be readily visualized that spring 64 biases the upper and lower jaws 38,40 to a closed position.

Figure 4:
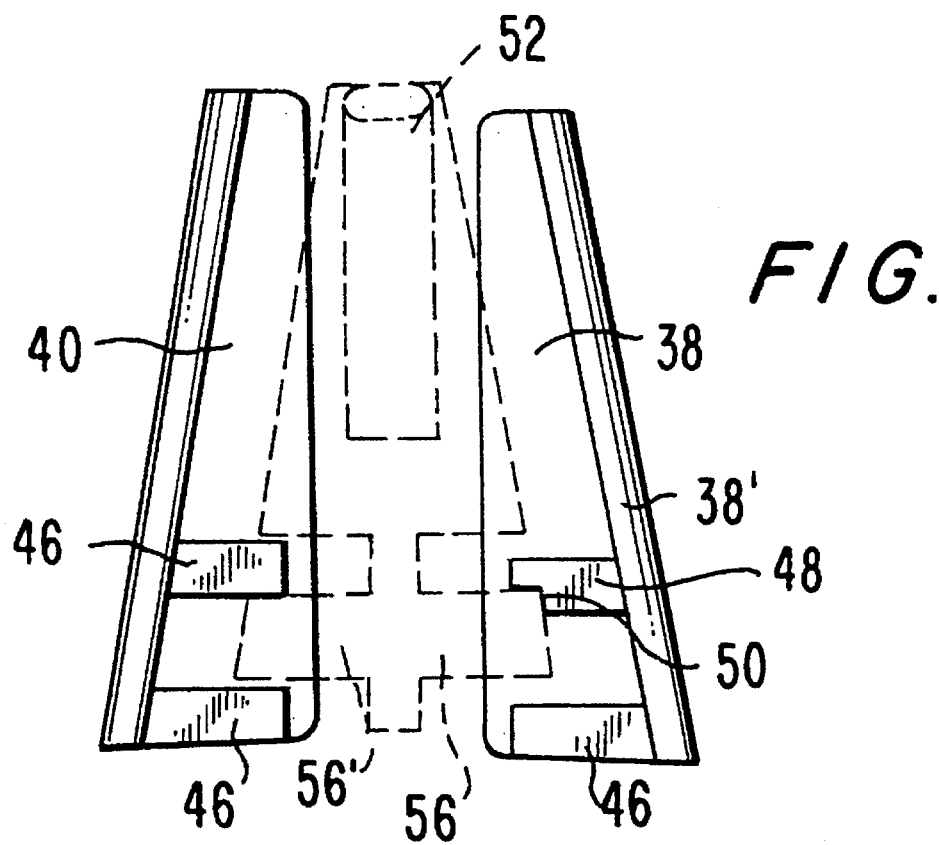
FIG. 4 is another view of the backside of the upper and lower jaws, showing the jaws locked into an open position.

With reference to FIG. 4, it may also be readily visualized that notch 50 in raised guide 48 of upper jaw 38 permits jaws 38,40 to be locked in an open position. In other words, so long as tab 56 of floater 52 is hung up on notch 50, spring 64 will not be able to move the jaws 38,40 into a closed position.

The jaw configuration and degrees of movement described above provide a structure suited for fastening to and securely gripping an electrical transmission line. By moving the jaws 38,40 longitudinally toward the U-shaped clevis 22, it should be understood that the jaws will move transversely apart. It should also be understood that the jaws 38,40 move in conjunction with each other by virtue of the interrelationship between their raised guides 46,48 and the tabs 56,56' on floater 52. Therefore, to move either the upper jaw 38 or the lower jaw 40 is to move the other jaw. In the figures, upper jaw 38 is shown as having a laterally extending eye 68 having an aperture, which facilitates its movement, and notch 50 on raised guide 48, which enables the jaws 38,40 to be locked open. It should be understood that the lower jaw 40 could be provided with these features, that is with the gripping structure afforded by laterally extending eye 68 and with the notch 50 on raised guide 48, in addition to, or instead of, providing upper jaw 38 with them, or that one jaw could be provided with the gripping structure, while the other could be provided with the notch 50 on raised guide 48.

In operation, the dead end 10 will be fastened to a utility pole or some other suitable structure at the U-shaped clevis 22 by means known in the art. An electrical transmission line will be positioned between upper and lower jaws 38,40, when the jaws 38,40 are locked into an open position. When the jaws 38,40 are released, they are moved by spring 64 away from the U-shaped clevis 22 and into a closed position, whereby the electrical transmission line is disposed between the arcuate faces 38",40" of jaws 38,40. The electrical transmission line will be gripped between the arcuate faces 38",40" by the transverse ribs 44 thereon. Because the electrical transmission line is in tension, the line will further pull the jaws 38,40 longitudinally away from the U-shaped clevis 22, thereby moving the jaws 38,40 transversely toward one another and more tightly upon the line, which firmly secures the line in place. The degree of movement of the jaws 38,40 is eventually restricted by the jaw guide walls 16,18, which apply downward pressure upon the jaws 38,40, which, in turn, apply downward pressure on the electrical transmission line. The line will be firmly fastened in place within the wedge dead end, and its further movement will be prevented.

The jaw material must be suitable to apply sufficient pressure onto the line to develop the full strength of the jaws 38,40, and may be of a non-conducting material as no current flow is involved. However, the jaws 38,40 may be fashioned of stainless steel.

While a particular embodiment of the present invention has been shown and described, it is clear that various changes and modifications may be made, and it is therefore intended in the following claims to cover all modifications and changes as may fall within the true spirit and scope of the invention.

What is claimed is:

1. A spring-loaded wedge dead end comprising:

a body portion, said body portion having a first end and a second end and a single leg therebetween, said body portion further having fastening means at said first end for fastening said dead end to a supporting structure, and upper and lower jaw guides supported in spaced angular relationship at said second end, said upper and lower jaw guides providing a U-shaped channel and converging toward each other so that said U-shaped channel is gradually narrowed or decreased in transverse dimension as it extends in a direction from said first end toward said second end;

a floater, said floater being a substantially planar, substantially wedge-shaped member on the bottom of the interior of said U-shaped channel and having a pair of opposed cut-outs defining a pair of opposed tabs;

upper and lower jaws slidably supported in said U-shaped channel over said floater so as to come into a wedging engagement about a conductor disposed therebetween upon movement of said upper and lower jaws toward said second end, said upper and lower jaws each having backsides facing said floater and each of said backsides having a pair of raised guides with a space therebetween, said tabs on said floater fitting into said spaces, said floater thereby coupling said upper and lower jaws together; and means for biasing said floater toward said second end.

2. A spring-loaded wedge dead end as claimed in claim 1 wherein said fastening means at said first end is a U-shaped clevis having apertures, so that a bolt may be passed through said apertures to secure said dead end to a fastening element, said U-shaped clevis being separated from and connected to said upper and lower jaw guides by said single leg.

3. A spring-loaded wedge dead end as claimed in claim 1, wherein one of said raised guides on the backside of one of said upper and lower jaws has a notch, one of said tabs on said floater being lodgeable in said notch when said upper and lower jaws are in an open position to lock said upper and lower jaws in open said position.

4. A spring-loaded wedge dead end as claimed in claim 1 wherein said bottom of said U-shaped channel has a bottom channel running from said second end of said body portion to an end wall, and wherein said floater has a downward tab projecting into said bottom channel, and further comprising a spring disposed in said bottom channel between said end wall and said downward tab on said floater, and biasing said floater and thereby said upper and lower jaws toward said second end and into a closed position.

5. A spring-loaded wedge dead end comprising:

a body portion, said body portion having a first end and a second end and a single leg therebetween, said body portion further having fastening means at said first end for fastening said dead end to a supporting structure, and upper and lower jaw guides supported in spaced angular relationship at said second end, said upper and lower jaw guides providing a U-shaped channel and converging toward each other so that said U-shaped channel is gradually narrowed or decreased in transverse dimension as it extends in a direction from said first end toward said second end;

upper and lower jaws slidably supported in said U-shaped channel so as to come into a wedging engagement about a conductor disposed therebetween upon movement of said upper and lower jaws toward said second end;

means for biasing said upper and lower jaws toward said second end; and means for coupling said upper and lower jaws so that movement of one of said upper and lower jaws will result in a corresponding movement of the other of said jaws, said means for coupling comprising a floater on the bottom of said U-shaped channel and beneath said upper and lower jaws, said upper and lower jaws thereby disposed on top of said floater in said U-shaped channel, said floater being substantially wedge-shaped and having a pair of opposed cut-outs and a pair of opposed tabs, and said upper and lower jaws each having backsides, each of said backsides having a pair of raised guides with a space therebetween, said spaces accommodating said tabs on said floater, said floater thereby coupling said upper and lower jaws together so that movement of one of said upper and lower jaws will cause corresponding movement of the other of said jaws through the medium of the floater, one of said raised guides on the backside of one of said upper and lower jaws having a notch, one of said tabs on said floater being lodgeable in said notch when said upper and lower jaws are in an open position to lock said upper and lower jaws in said open position.

6. A spring-loaded wedge dead end comprising:

a body portion, said body portion having a first end and a second end and a single leg therebetween, said body portion further having fastening means at said first end for fastening said dead end to a supporting structure, and upper and lower jaw guides supported in spaced angular relationship at said second end, said upper and lower jaw guides providing a U-shaped channel and converging toward each other so that said U-shaped channel is gradually narrowed or decreased in transverse dimension as it extends in a direction from said first end toward said second end;

upper and lower jaws slidably supported in said U-shaped channel so as to come into a wedging engagement about a conductor disposed therebetween upon movement of said upper and lower jaws toward said second end; and means for coupling said upper and lower jaws so that movement of one of said upper and lower laws will result in a corresponding movement of the other of said jaws, said means for coupling comprising a floater on the bottom of said U-shaped channel and beneath said upper and lower laws, said upper and lower jaws thereby disposed on top of said floater in said U-shaped channel, said floater being substantially wedge-shaped and having a pair of opposed cut-outs and a pair of opposed tabs, and said upper and lower jaws each having backsides, each of said backsides having a pair of raised guides with a space therebetween, said spaces accommodating said tabs on said floater, said floater thereby coupling said upper and lower jaws together so that movement of one of said upper and lower jaws will cause corresponding movement of the other of said jaws through the medium of the floater, wherein said bottom of said U-shaped channel has a bottom channel running from said second end of said body portion to an end wall, and wherein said floater has a downward tab projecting into said bottom channel, and further comprising a spring disposed in said bottom channel between said end wall and said downward tab on said floater, and biasing said floater and thereby said upper and lower jaws toward said second end and into a closed position.

* * * * *